Feb. 18, 1947.  W. G. ZIMMERLEIN ET AL  2,416,036
POST HOLE DIGGER
Filed Dec. 11, 1944   4 Sheets-Sheet 2

Inventors
William G. Zimmerlein
and LeRoy C. Siebert
By Mawhinney & Mawhinney
Attorneys

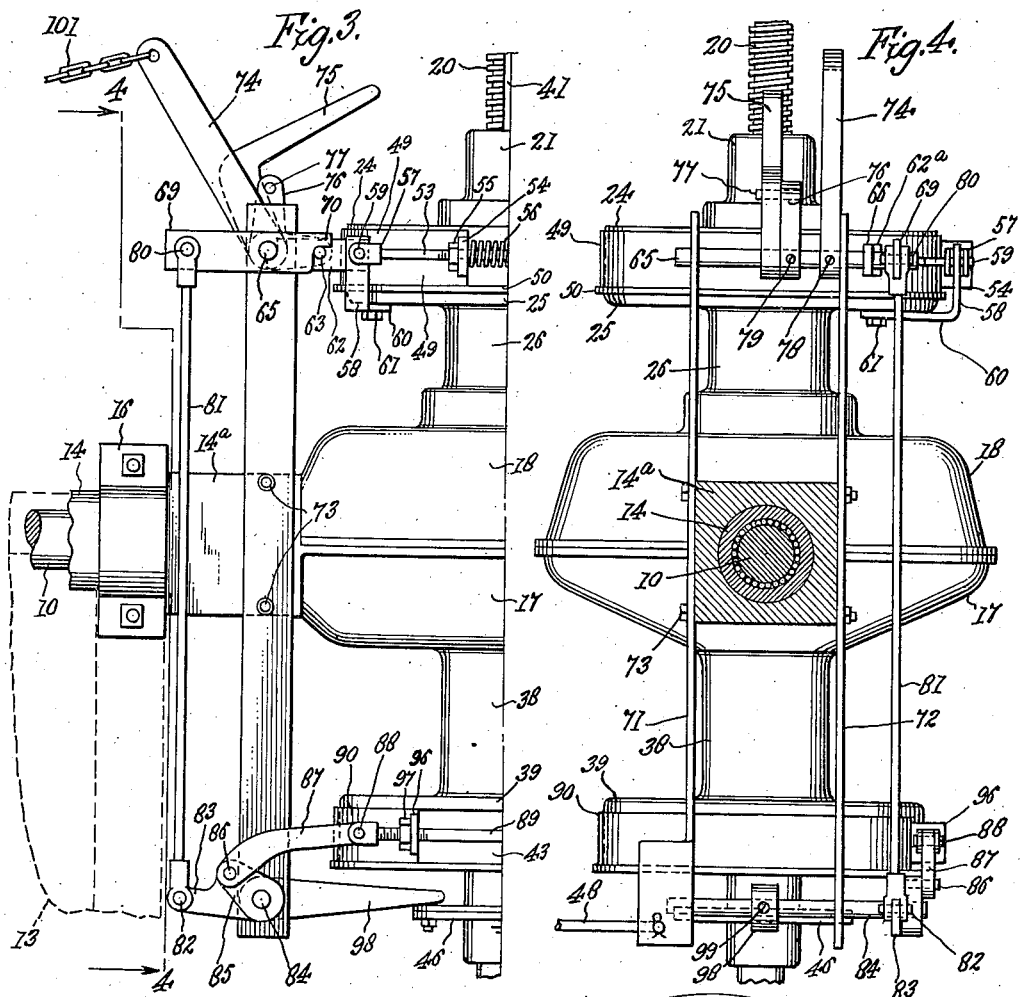
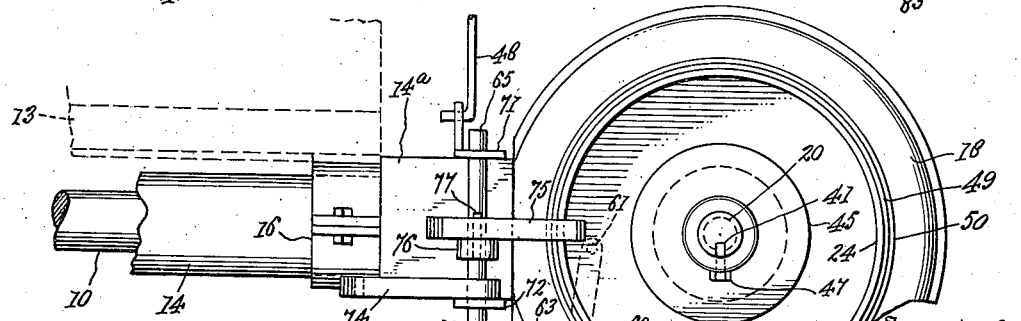

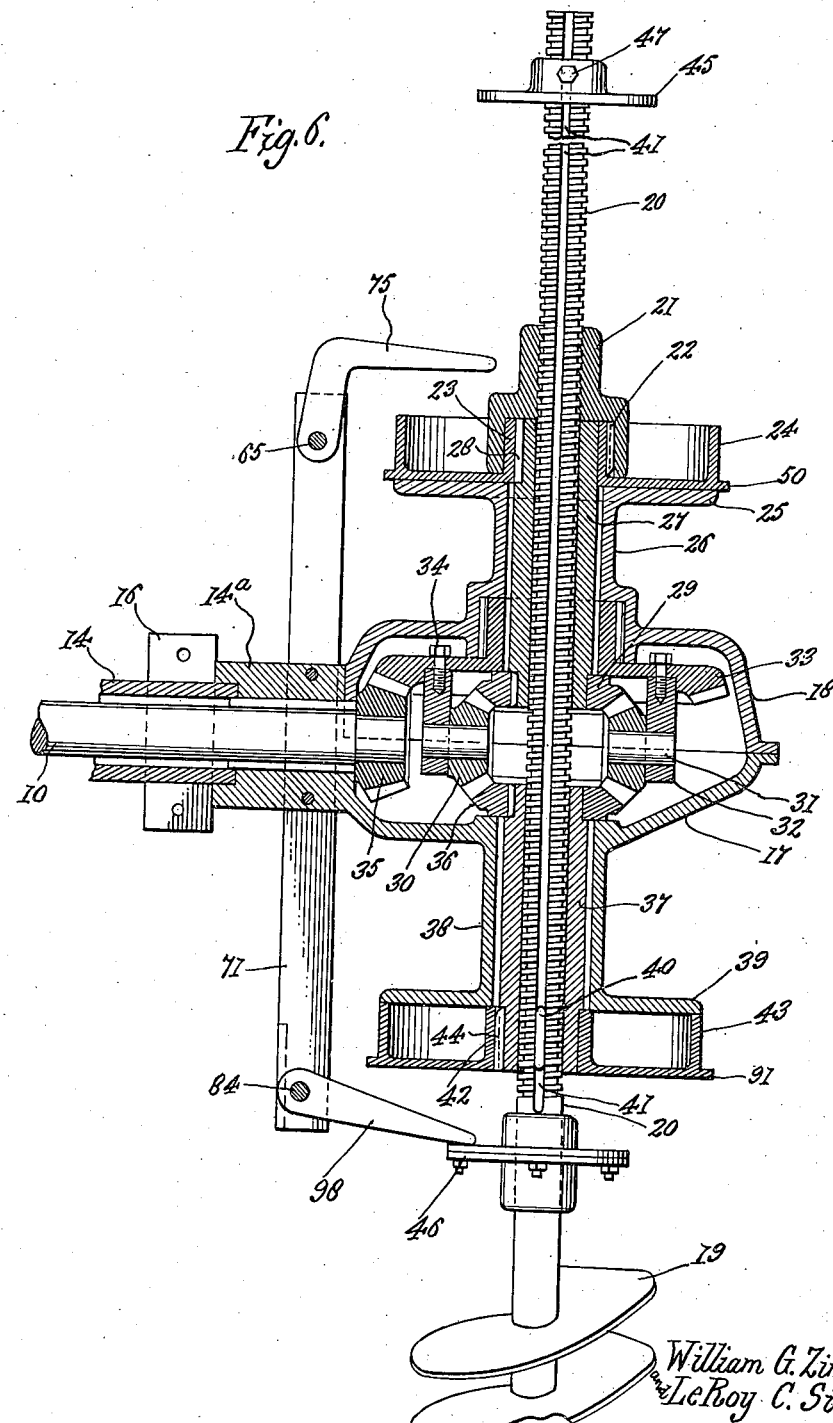

Patented Feb. 18, 1947

2,416,036

UNITED STATES PATENT OFFICE 2,416,036

POSTHOLE DIGGER

William G. Zimmerlein and Le Roy C. Siebert, Mendota, Ill.

Application December 11, 1944, Serial No. 567,584

11 Claims. (Cl. 255—22)

The present invention relates to improvements in post hole diggers, and has for an object to provide a power augur applicable to a conventional form of tractor without involving any essential modification in the tractor, but so arranged and constructed as to be manufactured separately from the tractor and mounted thereupon by unskilled labor.

Another object of the invention resides in providing a post hole digger or the like in which a novel form of drive mechanism is provided for the augur with the source of power developed from the tractor engine, and with the control of the apparatus governed by the operator of the tractor from the usual seat upon such tractor.

It is a further object of the invention to provide a tractor-equipped power augur in which a novel form of driving mechanism is constructed and arranged to drive the augur shaft down a predetermined distance and subsequently and automatically, after the work is done, to raise such shaft together with the augur, through a distance which will elevate the augur completely from the hole at which time a further automatic device comes into play for throwing the driving mechanism into a neutral position where all axial motion of the augur shaft is arrested.

A still further object of the invention is to provide a novel form of differential in combination with a braking mechanism by which the feed of the augur shaft is achieved, governed as to its longitudinal traverse, and automatically stopped after completing its cycle of movement with the digging of the hole and the removal of the augur therefrom to an initial position raised clear of the ground to enable the tractor to pursue its way to the next objective.

A still further object of the invention is to provide a driving mechanism for earth augurs and the like swivelly mounted from a tractor or other base support to enable the axis of the augur to be inclined or tilted as may be required in the formation of vertical holes or holes angularly intersecting the vertical.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a front elevation of a post hole digger attachment as shown applied to a conventional tractor and with the augur and its shaft in the raised position out of the ground.

Figure 3 is a view similar to Figure 2 of the braking mechanism with the parts shown in a subsequent position.

Figure 4 is a vertical section taken on the line 4—4 of Figure 3 and looking in the direction of the arrows.

Figure 5 is a top plan view of the mechanism with the parts as shown in Figure 3, and Figure 6 is a vertical section taken through the driving mechanism.

Figure 1:
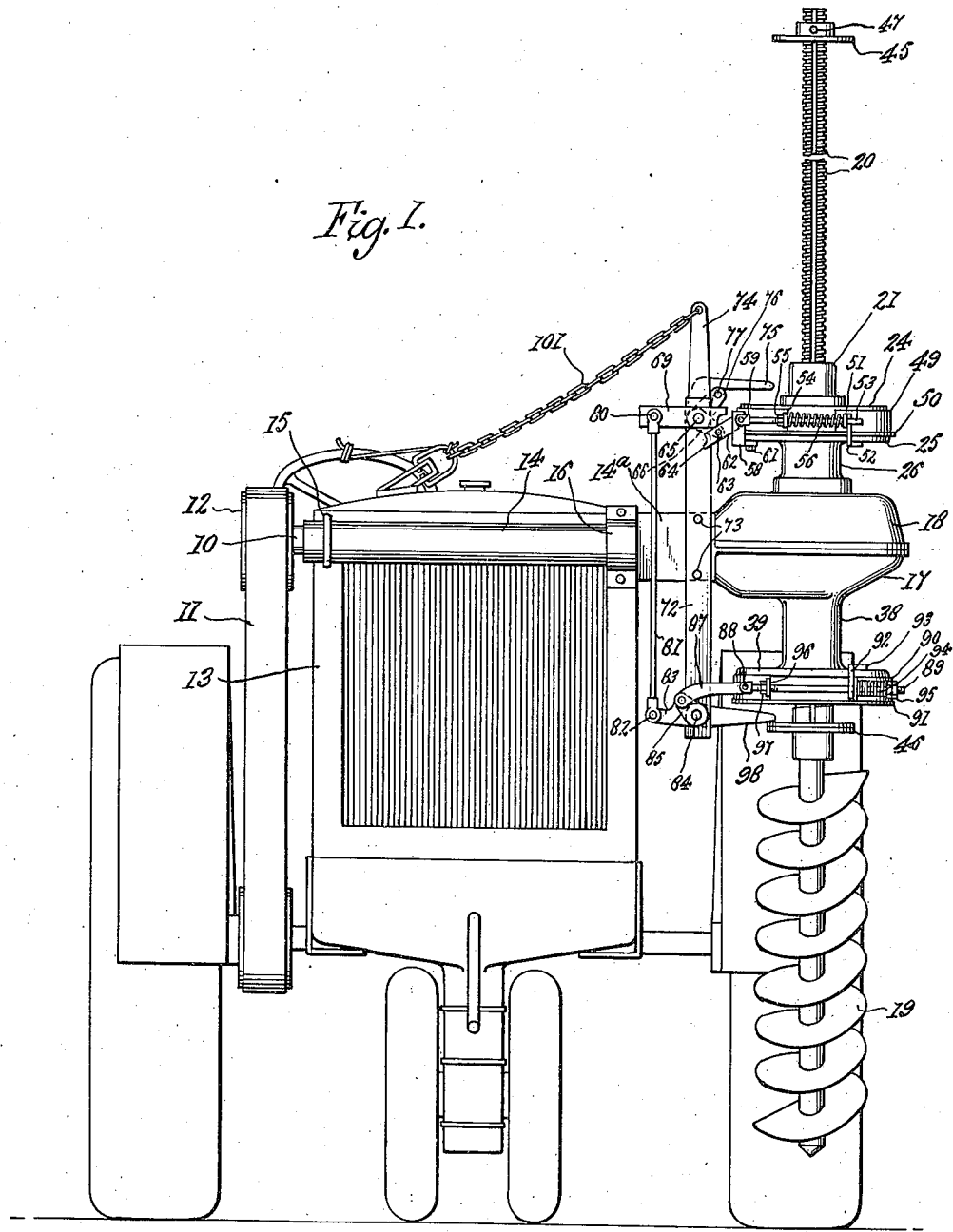

Referring more particularly to the drawings and for the present to Figures 1 to 6, 10 designates a power drive shaft driven by a belt 11 engaging a pulley 12 on said shaft 10, the belt 11 being driven from the customary power take-off shaft of the conventional farm tractor which is designated generally at 13.

This power drive shaft is journaled through a sleeve 14 supported in bearings 15 and 16 mounted upon the front frame portion of the tractor 13 in such manner that the axis of the power drive shaft 10 is transverse of the vehicle.

The sleeve 14 may be an extension of the gear case which is composed preferably of the two half sections 17, 18 bolted together or otherwise suitably connected. This gear case houses a differential mechanism and supports a power drive for the augur 19 and the augur drive shaft 20 which is threaded throughout its entire or a major length for the purpose of being fed up and down through a feed nut 21. This feed nut 21 has no axial travel but is rotatable to feed the shaft 21 downwardly therethrough by the differential mechanism; or at another stage is held stationary while the shaft 20 is rotated by the differential mechanism to cause the shaft and the entrained augur 19 to rise through the stationary nut 21.

The nut 21 is made fast by a spline 22 or otherwise to the hub 23 of an upper brake drum 24. This brake drum 24 is restrained against downward or axial movement by a flange 25 which may be a part of the upper section 18 of the gear case, being connected with that section through a hollow neck 26.

Within this neck is the upper rotary sleeve 27 which surrounds the screw shaft 20 and is independently rotatable thereof. This sleeve 27 has its upper end fitted into the hub 23 of the upper brake drum to which it is affixed by the spline 28 or otherwise. Thus whenever the sleeve 27 rotates, through such sleeve 27, spline 28, hub 23 and spline 22 the nut 21 will be constrained to like rotation. The rotation of the nut 21 is indicated in only one direction and when so rotated, assuming the screw shaft 20 to be held nonrotative, such screw shaft will be fed axially downward to cause the augur to enter the earth.

The sleeve 27 is driven through the differential mechanism by means of upper sleeve gear 29 which is a bevel gear in mesh with the planetary bevel gears 30 which are rotatably mounted in radial studs 31 carried in the differential rotary ring or spider 32. This spider 32 is affixed to rotate to the differential ring gear 33 by the bolts or other mounting means 34. The ring gear 33 is beveled to mesh with the bevel pinion 35 on the power drive shaft 10.

Opposed to the upper sleeve gear 29 is a lower sleeve gear 36, also beveled and meshing with the planetary gears 30. Gear 36 is affixed to the upper end of lower sleeve 37 which extends downwardly from the lower section of the gear case 17. The lower hollow neck 38 of the gear case houses the lower sleeve 37 and terminates in a lower flange 39. The screw shaft 20 extends through the smooth bore of lower sleeve 37. The lower sleeve 37 carries an inwardly projecting key 40 which enters a longitudinal keyway or slot 41 of the screw shaft 20. Thus the screw shaft 20 and lower sleeve 37 are constrained by key 40 to always rotate in unison but the longitudinal keyway 41 permits of relative axial movement of screw shaft 20 down and up through sleeve 37.

Lower sleeve 37 projects below lower flange 39 and receives thereon the hub 42 of the lower brake drum 43, there being a key or spline 44 locking the sleeve 37 to the hub of the brake drum 43.

From a comparative view point, while the lower sleeve 37 may have no relative rotation with respect to the augur screw shaft 20, and while the screw shaft 20 may execute both up and down movements relatively through the sleeve 37, the upper sleeve 27 has no direct connection with the screw shaft 20, such screw shaft 20 being both slidable axially and rotatable in the smooth bore of the sleeve 27. In this connection it should be noted, however, that the nut 21 is but an extension or prolongation of the upper sleeve 27, both sleeve 27 and nut 21 being confined against relative travel in either an axial or rotational sense. To put the matter another way, the internal threads of the nut 21 might be continued all the way down through the interior of the sleeve 27 without affecting the construction and mode of operation of the device.

The two flanges 25 and 39 act as mutual supports and stops to prevent endwise movement of the sleeves 27 and 37 and of the parts connected thereto, inasmuch as the upper and lower brake drums 24 and 43 are affixed to their respective sleeves 27 and 37.

Upper and lower stop collars 45 and 46 are provided on the screw shaft 20, the upper collar being slidable and adjustable axially of the screw shaft 20 and affixed in its adjusted position by means of a set screw 47 or other convenient device.

The arrangement is such that the entire drive mechanism as a unit may rotate about the horizontal axis of the power drive shaft 10. For this purpose a suitable handle 48 is affixed to and projects radially from the sleeve 14. By angularly turning the handle 48 the sleeve 14 and the gear case and all of the parts contained therein may be correspondingly rotated or angularly adjusted to any angle at which the augur 19 is required to enter the earth; this for the purpose of digging holes in the selective manner either vertically or at an inclination to the vertical.

Referring more particularly to Figures 2 to 5 inclusive, an upper brake band 49 embraces the upper drum 24 and is prevented from slipping off the drum by the lower ledge 50 which outstands circumferentially from the external cylindrical braking surface of the drum 24. One end 51 of the brake band 49 is turned radially outward and affixed to a stationary guide member 52. This guide member has a part extending down beyond the edge of the upper gear case flange 25 being affixed, as indicated at 68 beneath such flange 25. The outturned brake band edge 51 and guide member 52 are perforated to slidingly receive an end portion of a brake rod 53 which may substantially parallel a tangent of the circular upper brake drum 24. The other outturned free end 54 of the upper brake band 49 is affixed to the brake rod 53 as by threading the same into a threaded perforation of the end 54 with the nut 55 acting as a jam or lock nut adapted to be turned up against the terminal part 54. However, this connection may be made in any desired manner. A coil spring 56 of a desired number of convolutions envelopes brake rod 53 between the two ends 51 and 54 of the brake band 49. This spring is an expansive spring, normally abutting against stationary guide member 52 and urging the free end 54 of the brake band 49 into loose or open position about the brake drum 24.

The other or left hand end of the brake rod 53 is bifurcated, as indicated at 57 to receive an upstanding support 58 to which it is pivoted by the pin 59. The support 58 is carried upon a swinging arm 60 having a fulcrum or pivotal point 61 upon the lower side of the upper gear case flange 25.

The pin 59 also provides a pivot for an end of a link 62. Such link 62 has a pivot 63 engaged with its intermediate portion, the part 62ª of the link to the left of the pivot 63 having a stop finger 64 projecting outwardly from its lower edge in position to encounter the lower side of a shaft 65. The pin 63 also engages an arm 66 pinned, as indicated at 67, or otherwise affixed to the shaft 65. The links 62 and 66 together constitute a toggle lever connecting shaft 65 and brake rod 53 with the tail piece 62ª of lever 62 and its finger 64 acting to arrest the upward movement of the toggle lever when the three pivots 59, 63 and 65 get into substantial alignment or when the central pivot 63 gets just slightly above the line connecting the centers of the two pivots 59 and 65.

An arm 69 turning loosely about the shaft 65 has a tail piece 69ª with a stop finger 70 projecting from the upper edge thereof in position to engage the upper side of the pivot 63.

The shaft 65 is journaled to rock in the upper portions of vertically disposed members 71 and 72 of a frame which straddles a cross sectionally square portion 14ª of the sleeve 14 and may be affixed thereto by the bolts or other fastenings 73. Between the frame members 71 and 72, the shaft 65 carries an operating arm 74, an angle trigger arm 75 and a throw out arm 76, which latter carries a laterally projecting pin 77 for extending into the angular path of movement of the trigger arm 75 to engage the same. The arms 74 and 76 are affixed to the shaft 65 as by the set screws 78 and 79 but the arms 75 is freely rotatable about the shaft 65.

The arm 69 is connected by the pivot 80 to a rod link 81 extending down to a point below the lower brake drum 43 where it is pivoted, as at 82, to the longer arm 83 of a bell crank affixed to a shaft 84 journaled in the lower portions of the frame bars 71, 72. The shorter arm 85 of the bell crank is pivoted at 86 to an end of a link 87, the other end of which is pivoted at 88 to an end of a brake rod 89. The lower brake band 90 encompassing the lower drum 43 and supported upon the ledge 91 thereof has its outturned ends perforated to receive therethrough the brake rod 89. One end 91 of the brake band 90 is anchored to the stationary guide 92 through which the brake rod 89 freely slides. Such stationary guide is affixed, as at 93, to the upper surface of the lower gear case flange 39. A spring helix 94 is wound about brake rod 89 and abuts against the stationary end 91 of the brake band 90 and a pair of lock nuts 95 mounted on the right hand end of the brake rod 89, the spring 94 biasing brake rod 89 to a right hand thrust. The free end of brake band 90 is turned outwardly as indicated at 96, and coupled to the brake rod 89 as by screw threading. The threaded portion of the brake rod 89 may also carry nut 97 to exert the necessary thrust against the free end of the brake band 90. A trigger arm 98 is affixed as at 99 to the shaft 84 between the frame members 71, 72 in a position in the path of movement of the tripping disc 46 which is carried by the augur shaft 20. The operating arm 74 is connected by a chain 101 or other flexible connection to a point convenient to the operator of the tractor.

In operation the tractor engine through the belt connection 11 drives the shaft 10 and the bevel gear 35 in the differential casing. The ring gear 33 is consequently continuously rotated and this ring gear rotates freely in the gear case. It carries around with it the planetary pinions 30 which normally do not rotate about their studs 31 but exert equal pressure upon the bevel sleeve pinions 29 and 36 to rotate the same simultaneously in the same direction thus rotating the sleeves 27 and 37 in the same direction. Due to the spline 40 the rotating lower sleeve 37 carries the augur shaft 20 around with it. At the same time the upper sleeve 27 carries the nut 21 around with it. Thus augur shaft 20 and nut 21 rotate simultaneously at the same rate of speed and therefore the shaft 20 has no axial travel.

When its brake band 49 is tightened about the upper brake drum 24, the rotation of nut 21, upper sleeve 27 and its pinion 29 is arrested but the rotation of the lower sleeve 37 continues due to the fact that the planetary gears 30 now rotate about their studs 31. Rotation of the sleeve 37 through spline 40 causes continued rotation of augur shaft 20. In other words the screw shaft 20 rotates relatively to the now stationary nut 21 which entails a feeding of the shaft and the augur 19 downwardly. Thus the augur 19 is rotated and fed downward simultaneously to cause it to enter the ground and bore the necessary hole.

At the completion of the boring operation, the action is automatically suspended as hereinafter described and the upper brake is released while the lower brake 43, 90 is set. Due to the brake drum 43 being keyed at 44 to sleeve 37 and sleeve 37 keyed at 40 to screw shaft 20, the setting of the lower brake discontinues the rotation of the shaft 20, but the release of the upper brake causes the resumption of the rotation of nut 21 in the same direction, causing the feeding of the shaft 20 and augur 19 upwardly which action is permitted by the groove 41 of shaft 20 sliding up over the key 40.

The lower tripping disc 46 may be fixed upon the screw shaft 20 so that it will trip the trigger 98 always at the same time interval with reference to the length of the screw shaft 20; or in other words so soon as the lower end of the augur 19 has sufficiently cleared the ground line to enable the tractor to move forward to a new position without such augur encountering obstructions or being subject to breakage.

However, the upper tripping disc 45 may be set at various positions along the screw shaft 20 as to give the shaft 20 and the augur 19 a relatively greater or lesser traverse before the disc 45 contacts trigger 75.

Figure 2:
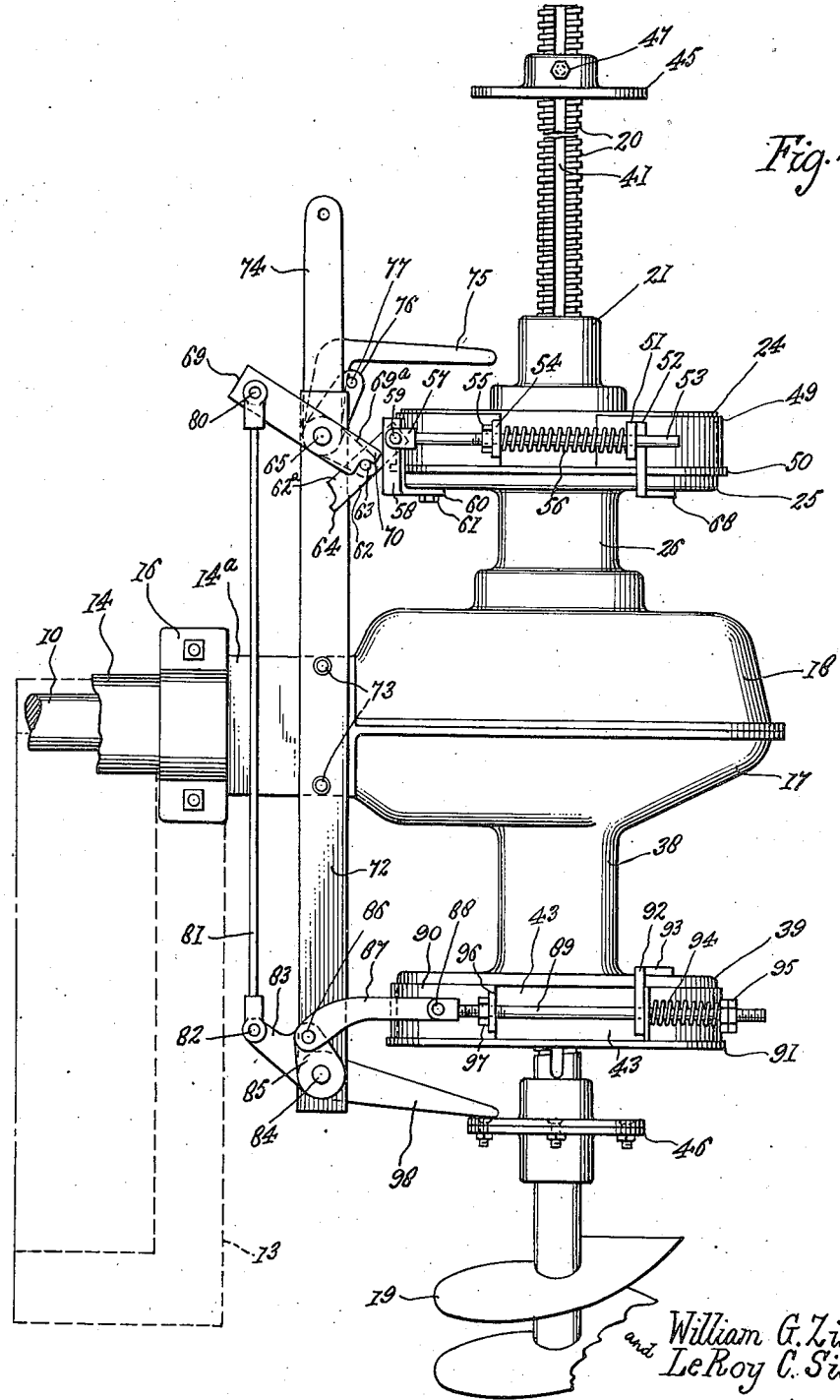
Figure 2 is a front elevation, taken on an enlarged scale, of the driving mechanism for the augur with parts broken away.

Figure 2 shows the augur position of the parts in which the toggle lever 62, 66 is broken downwardly at its intermediate joint 63, thus leaving the brake spring 56 unhampered to expand and open the brake band 49. This permits rotation of the upper brake drum 24 and the nut 21 along with the sleeve 27 and sleeve gear 29.

Figure 1 shows the neutral position of the parts. In the position shown in Figure 1 the augur 19 is raised above the ground and the tractor 13 may proceed to a selected locality. Here the operator pulls upon the chain 101 to rock the starting lever 74 from the position shown in Figure 1 to that shown in Figure 3. The movement of the starting lever 74 rocks the shaft 65 and the arm 76, causing pin 77 to rock the trigger 75 into the raised operative position shown in Figure 3.

The movement of starting lever 74 and shaft 65 also lifts arms 66 and the pivot 63 of the toggle lever lifting therewith the other member 62 of such toggle lever until the limit finger 64 strikes beneath shaft 65. In other words the toggle 62, 66 is straightened out pushing brake rod 53 to the right against the influence of spring 56 and setting the upper brake which locks the nut 21 against rotation.

In rising the intermediate toggle pintle 63 carries upwardly therewith the finger 70 thus rocking the lever 69, 69ª, which pushes down upon the link rod 81 and counter clockwise rotates bell crank 83, 85, thus pulling to the left on the link 87 and releasing the lower brake 39, 90.

With the upper brake set and the lower brake released, the nut 21 is held stationary and the screw shaft 20 rotated downwardly therethrough. This is the working action of the augur 19 in penetrating the ground.

The stop collar or disc 45 having been previously set upon the screw shaft 20 at a height above trigger 75 corresponding to the depth of augur penetration wanted, when the post hole is dug and completed, the stop disc 45 will have arrived at trigger 75 and rocked it to the position shown in Figure 2. Due to the pin 77 the trigger 75 will consequently also rock arm 76, shaft 65 and starting lever 74 back into the initial position shown in Figure 2. The clockwise rocking of the shaft 65 breaks the toggle links 66, 62 downwardly to release brake rod 53 to the opening action of its spring 56. The differential thereupon promptly resumes the rotation of the nut 21. In opening the toggle, the toggle central pivot 63 will simply retire downwardly from the finger 70 without acting to rotate the lever 69, 69ª which is loose on the shaft 65. However, as soon as the restraint of the central toggle pivot 63 is withdrawn, the lower brake spring 94 will expand applying the brake 39, 90 and drawing upon link 87 in a right hand direction, accompanied by clockwise rotation of bell crank 83, 85, the upward movement of the link rod 81 and the rocking of the lever 69, 69ª from the horizontal position of Figures 1 and 3 to the diagonal position of Figure 2. This is also accompanied by the movement of the lower trigger 98 down to the operative position shown in Figure 2.

With the upper brake released the nut 21 turns and with the lower brake set the screw shaft 20 is restrained from rotation. Thus the rotating nut 21 feeds the non-rotating screw shaft 21 upwardly raising the augur 19 out of the hole. When the stop disc or collar 46 engages trigger 98, the parts will be moved to the neutral position shown in Figure 1 in which the trigger 98 has counter clockwise rotated shaft 84, and in so doing has released the lower brake 39, 90 without setting the already open upper brake 24, 49.

The rotation of the shaft 84 pulls down upon rod 81 and rotates lever 69, 69ª from the position of Figure 2 to that of Figure 1. The lever 69, 69ª being loose on shaft 65, such movement of the lever will not affect the shaft nor the toggle 62, 66 which remains in the downwardly broken positions of Figures 2 and 1. Thus both brakes are released. With both brakes open, the nut 21 and screw shaft 20 rotate together which has no effect other than to rotate the already raised augur.

The parts are now in neutral position as shown in Figure 1, the tractor may be moved to a new position and the starting lever 74 swung over to initiate the same cycle of operations.

As shown in Figures 4 and 5 the frame 71, 72 may be utilized for its great leverage in rotating the gear case and other parts about the axis of the shaft 10 in order to change the angle at which the augur 19 enters the earth. To conveniently do this a rod 48 is attached to one of the frame members 71 and if desired the frame members may be of angle iron construction or flanged, as shown in Figures 4 and 5, to accommodate the connection of the rod or link 48. This rod or link 48 may extend to a lever fulcrum on the tractor near the driver's seat but this construction is not illustrated as it forms no part of the invention, it being understood that any suitable arrangement may be utilized to rock the gear case through the desired angle.

It is obvious that various changes and modifications may be made in the details of construction and design of the above specifically described embodiment of this invention without departing from the spirit thereof, such changes and modifications being restricted only by the scope of the following claims.

What is claimed is:

1. A post hole digger or the like comprising an augur and augur screw shaft, a rotary non-traveling nut on the shaft, a differential for driving both the nut and shaft, a normally-open brake for the nut drive of the differential, a normally-set brake for the shaft drive of the differential, setting means for the nut brake, release means for the shaft brake, one-way connecting means for operating the release means following the operating of the setting means but not affecting the open position of the setting means when the release means is operated, manual means to initiate the cycle by operating said setting means to set the nut brake and thus through said connecting means to operate the release means to permit rotation of the screw shaft through the stationary nut, trip means between the shaft and setting means for opening the setting means, and trip means between the shaft and release means for opening the release means 2. A post hole digger or the like as claimed in claim 1 in which said setting means for the nut brake comprises a toggle-lever with means for arresting the straightening motion of the lever when the central pivot is on dead center or slightly past the dead center position.

3. A post hole digger or the like according to claim 1 characterized by the fact that the setting means is comprised of a toggle lever with a central projecting pivot, said projecting pivot positioned to actuate said connecting means in one sequence as heretofore set forth and free to move away from said connecting means in the breaking or opening motion of the toggle lever without affecting said connecting means.

4. A post hole digger or the like as claimed in claim 1 wherein said release means for the shaft brake comprises a bell crank lever having one arm secured to said connecting means and the other arm coupled to the shaft brake, the last named trip means being connected to said lever.

5. A post hole digger or the like according to claim 1 in which the setting means comprises a toggle lever, a shaft for operating said toggle lever on which one member of the toggle is fast, the other member of the toggle having a tail piece with stop means for engaging said shaft in the straight position of the toggle lever.

6. A post hole digger or the like according to claim 1 wherein the setting means comprises mutually pivoted toggle arms one of said arms pivoted to the brake rod of the nut brake at a point where such brake rod is carried upon a swivel support.

7. A post hole digger or the like according to claim 1 wherein a rock shaft operated by a manual starting means is positioned and connected to actuate said setting means and through said connecting means to simultaneously actuate said release means to set the nut brake and release the shaft brake, said connecting means comprising a lever free on said shaft and having a tail piece with a finger in the path of and operated by the intermediate pivot of the toggle lever which forms part of the setting means.

8. A post hole digger or the like according to claim 1 in which the setting means comprises two mutually pivoted links adapted to break downwardly and forming a toggle lever with one link having a tail piece and the stop finger projecting therefrom, a brake rod of the nut brake pivoted to the free end of the link having the tail piece, a swinging support for such pivot joint, a shaft to which the other link is affixed positioned to be engaged by said stop finger when the toggle pivots have past dead center, starting means to rotate said shaft in the direction to straighten the toggle links and apply the nut brake, the central movable pivot of said toggle lever projecting laterally from said links, said connecting means comprising a lever loose on said shaft having a tail piece with said finger projecting above and in the path of said centrally projecting pivot.

9. A post hole digger or the like as claimed in claim 1 in which said first named trip means comprises a longitudinally adjustable stop member on said augur screw shaft, and a rotatable trigger member positioned to be engaged and moved by said stop member, and connections between said trigger member and setting means to cause opening movement of the setting means and nut brake when the trigger means is moved by said stop member.

10. A post hole digger or the like according to claim 1 in which said setting means comprises a shaft, starting means for rotating said shaft, a link affixed on said shaft, a second link pivoted to the first link to form a toggle lever and also pivoted to the brake rod of the nut brake, said first named trip means comprising an arm fixed on said shaft having a pin thereon, a trigger loose on said shaft in the path of said pin, and stop means on the upper portion of the augur shaft adapted to engage said trigger.

11. A post hole digger or the like according to claim 1 in which said last mentioned trip means comprises a fixed stop member on the screw augur shaft in combination with a trigger in the path of said stop member to be moved thereby, said release means comprising a lever turned by said trigger and having a link connected to the brake rod for the shaft brake.

WILLIAM G. ZIMMERLEIN.
LE ROY C. SIEBERT.

REFERENCES CITED

The following references are of record in the file of this patent:

UNITED STATES PATENTS

| Number | Name | Date |
| --- | --- | --- |
| 1,873,404 | Hild | Aug. 23, 1932 |
| 1,887,172 | Smith et al. | Nov. 8, 1932 |
| 2,273,203 | Keene et al. | Feb. 17, 1942 |
| 1,668,885 | Barnes | May 8, 1928 |